United States Patent

Stenbacka

[15] 3,696,871

[45] Oct. 10, 1972

[54] ROTARY POWER TOOL HAVING AUTOMATIC TORQUE SHIFT

[72] Inventor: Johan Runar Stenbacka, Sodertalje, Sweden

[73] Assignee: Atlas Copco Aktiebolag, Nacka, Sweden

[22] Filed: July 6, 1970

[21] Appl. No.: 52,421

[30] Foreign Application Priority Data

July 7, 1969  Sweden ...................9611/69

[52] U.S. Cl. ...................173/12, 81/52.4, 81/57, 192/48.6, 192/54
[51] Int. Cl. .............................................B25b 23/14
[58] Field of Search ...173/12; 81/52.4, 57; 192/48.6, 192/54

[56] References Cited

UNITED STATES PATENTS 3,398,611  8/1968  Hahner.....................81/52.4

FOREIGN PATENTS OR APPLICATIONS 610,490  12/1960  Canada..........................81/57

*Primary Examiner*—Ernest R. Purser
*Attorney*—Bauer and Goodman

[57] ABSTRACT

A rotary pneumatic torque tool such as a non-impacting nut runner, a screw driver or like tool, having means for automatic torque shift between a motor unit and an output shaft, said shift being obtained in response to the torque required for rotating a threaded member to be fastened, whereby the threaded member is first rotated at high speed and low torque and, when a predetermined reaction torque at the threaded member is exceeded, at low speed and high torque to reduce the total time for securing the threaded member.

12 Claims, 4 Drawing Figures

PATENTED OCT 10 1972

3,696,871

ROTARY POWER TOOL HAVING AUTOMATIC TORQUE SHIFT

The present invention relates to rotary pneumatic torque tools such as non-impacting nut runners, screw drivers and like tools and more particularly to such a tool having an output shaft operated by a motor via a gear including one or more speed reducing gear steps. The outer end of the output shaft is formed with a key seat or the like arranged to either directly or indirectly via a nut sleeve, be connected to a machine member such as a nut or bolt to be fastened. During the execution of the work operation, said output shaft shifts from a low-torque transmitting to a high-torque transmitting clutching position, depending on the power requirements. In the following the tool under consideration is referred to as a nut fastener.

In U.S. Pat. No. 2,928,302 a nut drive is disclosed which operates by means of a pressure air motor via three or more planetary gears, an output shaft having a speed corresponding to the motor power and the total gear reduction. Such nut fasteners are mainly designed to tightly fasten large screws, bolt joints, valve seats or similar mountings where there is a great need to control the fastening torque. This can, within the limits of the motor power, be adjusted as desired by regulating the pressure of the air supplied to the motor. When a fastening corresponding to the adjusted torque is carried out, the motor stops whereby the air supply is manually disconnected and the tool is thereafter removed from the working position.

However, said type of nut fasteners cannot be generally used in connection with mass production, since the output shaft of such fastener has a reduced speed which corresponds to the maximum torque transmitting capacity, and thus during the initial fastening period for fastening a machine member such as a nut or bolt, the speed is far too low. This results in the total operation time being, in certain cases, ten times longer than the time allotted for the execution of the total fastening operation.

To equip such a nut fastener with a larger pressure air motor to achieve a better work capacity has been shown to be difficult to accomplish, since the motor here demands a significantly greater amount of air. This results in a high level of noise. Furthermore, the nut fastener as a whole will be far too bulky to allow easy handling of same.

Because of the aforesaid drawbacks, it is usual to instead use so-called hammering nut fasteners which are considerably faster than the above mentioned nut fasteners but which also have a number of known drawbacks. These drawbacks include, inter alia, powerful shaking and vibrations which are markedly transmitted to the mounting and to the operator who is subjected to great stress on his wrists. The noise level as a rule exceeds the limit which is considered allowable; and can cause hearing defects. Furthermore, it is difficult when fastening with a hammering nut fastener to ensure that a fixed tolerance range for a fastening torque is obtained.

In order to eliminate the aforesaid drawbacks and to reduce the torque transmitting capacity of a nut fastener during the initial fastening period, said reduction being desirable from a safety point of view, the present invention has been essentially formed as a clutch unit that is connectable to said nut fastener. To this end, the invention is mainly characterized by the features given in the appended claims.

The present invention has substantially the same object as is stated in Swedish Patent No. 216,218 — i.e. to produce a nut fastener which, at the beginning of the work operation, works with high speed and a small torque in order to bring the fastening member to an initial fastening, and which, when resistance arises, automatically shifts to drive the fastening member with low speed and great torque until said mounting is finally securely fastened.

However, the device referred to above is limited to a portable hand tool having a small torque transmitting capacity. Also, the reaction force occurring during the work operation must, in said known device, be absorbed by the operator himself. Thus, as mentioned above, the construction of the device is wholly suited for low-torque transmitting, which then especially applies to the design of the gear clutch. Consequently, the device is not suitable to be used when mounting e.g. wheel rims on vehicles, or similar work in a heavier industry.

The nut fastener according to the present invention can, if desired, be designed for both low- and high-torque transmission, but the main purpose is however to widen the range of use for nut fasteners by increasing their working capacity. This increase is obtained by utilizing a high output speed of rotation for the nut fastener as long as the required torque will so permit. With high-torque transmitting nut fasteners, the combined unit is equipped with mountings for suspending same at the work place in a balancing block or the like. A sleeve unit connected to the clutch unit is provided with a reaction stay which, during the working operation, absorbs arising reaction torque by engaging a torque-preventing projection, machine part or the like. With said supplementary equipment, the operator can also easily handle relatively heavy nut fasteners during the execution of the work operations.

A nut fastener according to the present invention will be more closely described below with reference to the enclosed drawings figures.

Figure 4:
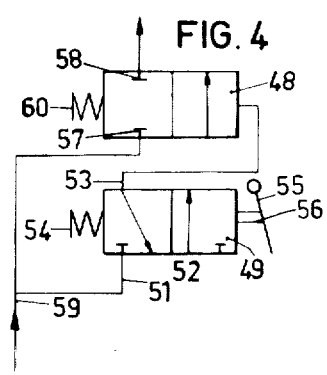

FIG. 4 schematically shows how servo means are connected to operate the nut fastener.

The nut fastener according to the embodiment shown consists of three main units, namely a motor unit 1, a clutch unit 2 and a sleeve unit 3 detachably connected to each other in axial alignment, and further of a number of servo members attached to the motor unit to regulate the functions of the nut fastener. The motor unit 1 has a casing 4 which encloses a pressure air motor and a speed reduction gear including three coaxial planetary gears 5, 6, 7 which gradually reduce the motor speed and mutually co-operate in such a way that the sun wheel (not shown) in the respective planetary gear constitutes the input shaft and the planetary holder (not shown) constitutes the output shaft of the respective gear step. The design of the motor unit is essentially previously known. Therefore, the following description of same is limited to such changes which have been made to adapt the motor unit to the present invention.

A hollow driving shaft 8 extends from the motor unit 1 and is securely connected with the planetary holder (not shown) of the last planetary gear 7. In the device according to the present invention, the shaft 8 is provided with a bore in which a second driving shaft 9 is rotatably journalled. The driving shaft 9 has, at its end which extends into the motor unit 1, a profiled shape, e.g. hexagonal, with which it non-rotationally engages the sun wheel (not shown) of the last planetary gear 7 or of the planetary gear 6 immediately preceding the planetary gear 7. In this way, two driving shafts 8, 9 concentrically project from the engine unit 1 to rotate at different speeds.

Both driving shafts 8, 9 extend into the clutch unit 2 which by means of a flange 11 is detachable connected to the motor unit 1. The flange 11 is secured to one end of a casing 10 enclosing the clutch unit 2. The driving shafts 8, 9 constitute the input shafts of the clutch unit 2. The inner shaft 9 during operation has a high rotational speed and is intended to transmit low torque while the outer shaft 8 has a reduced speed relative to the shaft 9 and is intended to transmit high torque.

With regard to said functions, the outer end of the driving shaft 8 has a square cross section with which the shaft 8 engages a corresponding square central end-hole 8a in a clutch sleeve 12 rotatably journalled in the casing 10 of the clutch unit. The driving shaft 9 is, at its end entering into the clutch unit 2, shaped or securely connected with a tooth rim 18a, constituting one half of a tooth clutch which is provided to automatically disengage the driving shaft 9 from a drive-transmitting function upon operation when the torque required at an output shaft 14 of the clutch unit 2 exceeds a predetermined value. The driving shaft 9 is rotatably journalled by means of a ball bearing 15 in the clutch sleeve 12 and is locked in axial position in relation to the sleeve 12 by means of a washer 19.

The output shaft 14 is rotatably journalled by means of two ball bearings 16 17 in the clutch sleeve 12 and is locked in axial position relative to said sleeve 12 by a washer 13 and by an end plate 20 which is secured to the end of the clutch sleeve 12. A free wheel coupling device comprises two free wheel couplings 22, 23 mounted between the bearings 16, 17 on the output shaft 14 and being operative between the clutch sleeve 12 and the output shaft 14. Between the free wheel couplings 22, 23 and the respective ball bearings 16, 17 are mounted distance washers 21.

The function of such free wheel couplings 22, 23 is well known and implies in this case that the clutch sleeve 12 shall drive the output shaft 14 upon certain driving conditions described below. Each coupling 22 and 23 respectively, includes a number of back stop elements 24 which are spaced around a free wheel hub and are radially activated. The back stop elements are preferably in a conventional manner shaped as canted rod elements with an approximately 8-shaped cross-section. The stop elements are journalled in two annular holders 25, 33 and co-operate with a resilient member 45 between the clutch sleeve 12 and the output shaft 14. These back stop elements 24 permit free rotational movement of the output shaft 14 relative to the sleeve 12 when the stop members 24 are released due to relative rotation of the sleeve 12 and the shaft 14 in one direction. When the stop elements 24 are actuated in the opposite direction of torsion, due to friction forces, the sleeve 12 and the shaft 14 are locked in relation to each other whereby said clutch sleeve 12 will drive the output shaft 14.

The outer end of the output shaft 14 has a polygonal cross-section 14a, or the like, to co-operate with the sleeve unit 3. The inner end of the shaft 14 has a tubular part 14b on which a clutch sleeve 18b is mounted for axial displacement. At the end of the sleeve 18b is formed a second tooth rim 18c, adapted to cooperate with the first tooth rim 18a. At its opposite end the sleeve 18b is formed with internal longitudinal splines 18d. The internal splines 18d engage corresponding outer splines on the part 14b of the output shaft 14. In this way the clutch sleeve 18b is non-rotationally connected with the output shaft 14 but may be axially displaced.

Figure 2:
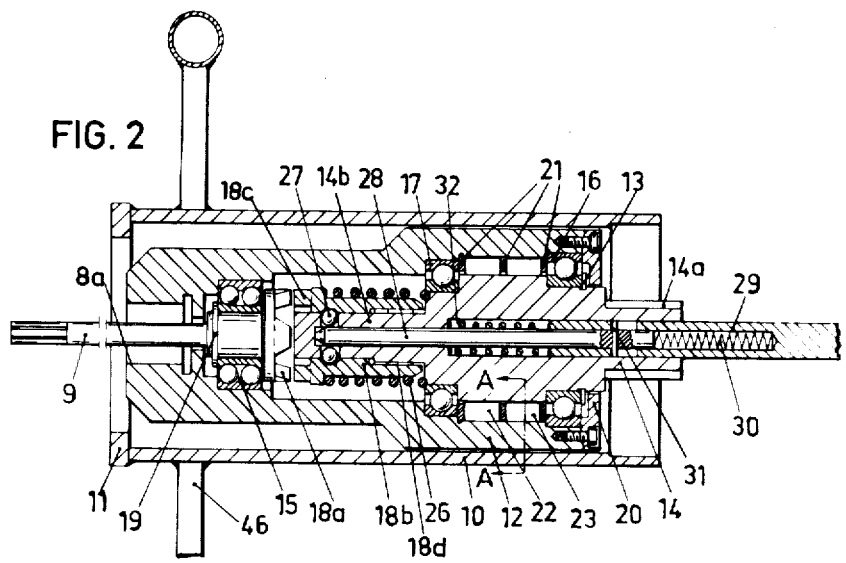
FIG. 2 shows in section the clutch unit indicated in FIG. 1.
Figure 3:
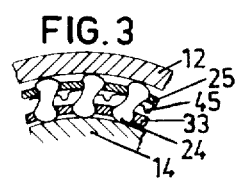
FIG. 3 shows the free wheel clutch seen in section A—A in FIG. 2.

The clutch sleeve 18b is under the influence of a helical pressure spring 26 which is mounted around the sleeve 18b and rests with one end against a flange on the inner end of the sleeve 18b. The pressure spring 26, rests with its opposite end against a shoulder on the output shaft 14 and tends to displace the clutch sleeve 18b to engage the tooth rim 18c with the tooth rim 18a on the driving shaft 9. However, in the disengaged position of the tooth clutch 18a, 18c according to FIG. 2, the clutch sleeve 18b is prevented from displacement towards the tooth rim 18a by a ball locking mechanism which has three balls displaceably journalled in radial holes in the tubular part 14b of the output shaft 14. These balls engage an annular groove formed in the bore of the clutch sleeve 18b when the balls are urged radially outwardly by an actuating rod 28 centrally mounted in the output shaft 14. For cooperation with the balls 27, the actuating rod 28 has a conical end. Its opposite end engages a central bore in a push rod 29 displaceably mounted in the sleeve unit 3 and in the output shaft 14. In said bore is mounted a pressure spring 30 which actuates the relative displacements of the actuating rod 28 in the push rod 29. To limit the axial displacements, the rod 28 is provided with a diametrically extending locking pin 31 which engages two opposite longitudinal slots in the push rod 29.

Axially inside the inner end of the push rod 29 in the output shaft 14, a pressure spring 32 is provided to rest against an annular abutment in the bore for guiding the rod 28. This pressure spring 32 actuates the inner end of the push rod 29. The purpose of the springs 30, 32 and the operation of the locking mechanism will be described below in connection with a more complete description of the function of the nut fastener.

As previously mentioned, the sleeve unit 3 is connected at the output end of the clutch unit 2. A nut sleeve 34 rotatably mounted in the sleeve unit 3 fits non-rotationally into the output shaft 14 of the clutch unit 2. A cap 35, which encloses the nut sleeve 34, is detachably mounted to the cylindrical casing 10 of the clutch unit 2 by means of a number of guide pins 36 and screws 37. The nut sleeve 34 is rotatably journalled in the cap 35 by means of a needle bearing 38 and a ball bearing 39. The outer free end of the nut sleeve 34 has a key seat for engaging a nut or similar machine member to be fastened.

The nut sleeve 34 has a central bore 34a for journalling the push rod 29. A piston 40 is displaceably journalled in a widening of the bore 34. To limit the displacement movements of the piston 40, a pin 41 fastened in the nut sleeve 34 engages the piston 40 in an oblong groove.

In order to enable an easy handling of the nut fastener according to the invention, it is designed to be mounted at the work place in a balancing block or the like. To this end, a clamp 43 is secured on the ordinary handle 50 on the motor unit 1. The outer shank of the clamp 43 is securely connected with a steel band around the casing 10 of the clutch unit, said band permitting turning of the casing 10. A carrying ring 44 is secured to the clamp 43. The nut fastener is mounted with said ring 44 to obtain a desired balanced position.

Figure 1:
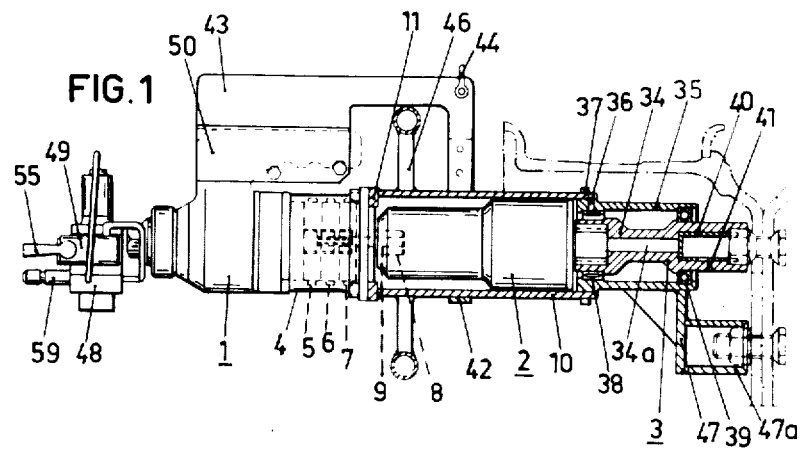
FIG. 1 shows a partially broken view of the nut fastener as a whole in its working position.

For operating the nut fastener during the execution of the work operations, a handle 46 is secured to the casing 10 of the clutch unit. To absorb the reaction torque during a fastening operation, a reaction stay 47 is secured to the cap 35 of the sleeve unit 3. In the embodiment shown in FIG. 1, the stay 47 is equipped with a fixed sleeve 47a which grips a nut. Such a sleeve design for the stay 47 can be used in given dividing relationships between the actual fastening machine members, in this case concerning the screw connections at wheel rims.

In order to control the function of the nut fastener, a release valve 49 and a head valve 48 are mounted on the motor unit 1. The release valve 49 is a three-way valve. This means that it has three outer connections, namely an air intake 51, a by-pass 53 and an outlet 52. The by-pass 53 can alternatively be connected to communicate with the intake 51 or the outlet 52 by means of axial displacement of a function-controlling valve member (not shown). Said valve member is actuated by an actuating pressure spring 54 urging the valve member towards the disengaged position —i.e. the outlet connection. To engage the release valve 49 — i.e. the intake connection — manual actuating of the valve member in the opposite direction is required. This is produced in the arrangement according to the invention by pressing-in a pivotally mounted arm 55 which is connected via an actuating rod 56 with the valve member.

The head valve 48 is a two-way valve. This means that it has an air intake 57 and an outlet opening 58, between which a valve member (not shown) is arranged to open and close the connection between the intake 57 and the opening 58. In a device according to the present invention, the valve members controlled by a pressure spring 60 acting in a disengaging direction, and by air supplied from the connecting conduit 53 of the release valve 49 to the head valve in the direction for obtaining connection. When the arm 55 is pressed in, the release valve 49 is opened. Said release valve 49 in its turn opens the head valve 48 thus making possible the passing of the pressure air from a main intake 59 through the head valve 48 to the pressure air motor of the motor unit. In FIG. 4, the valve function is schematically illustrated in the disengaged position to the left, and in the connected position to the right, in respective rectangular coupling diagrams.

In the starting position of the nut fastener, the push rod 29 under the influence of the pressure spring 32 is pressed out as far as the groove in the piston 40 and the pin 41 allow. When the push rod 29 makes its displacement movement, it actuates the actuating rod 28 by means of the pin 31. In this way the conical end of said rod 28 has been withdrawn from the locking balls 27. The balls then occupy a radially inner position in their radial holes and allow the clutch sleeve 18b to engage the drive shaft 9 by means of the tooth rims 18c and 18a in response to the action of the pressure spring 26.

When a nut fastening operation is started, the outer key seat of the nut sleeve 34 fits on the nut to be fastened at the same time as the sleeve 47a on the reaction stay 47 is fitted on an adjacent nut, or the like. When mounting the nut fastener with a light press in axial direction, the piston 40 is pressed, and thereby also the push rod 29 in the nut sleeve 34 and the output shaft 14 respectively. In this way the spring 32 is compressed. Under the influence of the pressure spring 30, the actuating rod 28 is pressed to engage the balls 27 without, however, being able to penetrate between said balls as long as the tooth clutch 18c, 18a is connected.

When starting the pressure air motor according to the aforesaid, the driving shafts 8, 9 will be simultaneously rotated at different speeds. Since the halves 18a, 18c of the tooth clutch constantly engage each other, the output shaft 14 will be rotated at the same speed as the driving shaft 9. The teeth on the two halves 18a, 18c of the clutch are so inclined that they are only capable of transmitting a limited or a predetermined maximum torque. When such a torque is attained during a work operation, the tooth rim 18c of the clutch sleeve 18b is pushed from its engagement with the tooth rim 18a. Thereby the inner groove of the sleeve 18b will be positioned to register with the balls 27 which will be radially displaced by the rod 28 to engage the groove and lock the sleeve 18b in disengaged position.

The clutch sleeve 12, which has been idling relative to the output shaft 14 upon its rotation at a high speed, now takes over the drive of the output shaft 14 through the free wheel couplings 22, 23, when the tooth clutch 18a, 18c is disengaged. This occurs because the back stop members of the free wheel couplings are locked and acts as driving members in a manner known per se.

When a fastening corresponding to the capacity of the nut fastener has been carried out, the motor stops, whereby the operator disconnects the air supply to the motor and removes the nut fastener from the work position. The clutch members hereby automatically resume their starting positions as described above.

By using a free-wheel coupling 22, 23 with radially active back stop members 24, that is back stop members without any substantial axial power transmission components, and by providing the free-wheel coupling 22, 23 and the torque transmission limiting clutch 18a, 18b on opposite sides of the central bearing 17 in the clutch sleeve 12, the tool will be able to transmit, with maintained constructional light-weight and simple bearing arrangement, a much higher maximum operative torque than before. Furthermore, by locking the torque transmission limiting clutch 18a, 18b in its released position by means of the ball locking mechanism 27, noisy and power consuming ratching of the clutch teeth 18a, 18b is completely avoided, which of course also follows from the use of a free-wheel.

As a further advantage, the automatic torque shift parts of the tool may easily be designed as a separate unit which is connectable with its input means to a combined motor and speed reduction unit usable as such for other purposes, if so desired.

What I claim is:

1. A rotary pneumatic torque tool having means for automatic torque shift and comprising a motor unit (1) including a speed reducing gear having one or more reduction gear steps (5,6,7), a clutch sleeve member (12) drivingly connected to the last gear step (7) for transmitting high torque, an output shaft (14) co-axial with and rotatably mounted relative to said clutch sleeve member and connectable to means (3) for engaging a workpiece, said output shaft (14) being rotatably mounted in an internal central bearing (17) provided in the clutch sleeve member (12), an input or driving shaft (9) co-axially and rotatably journalled relative to said clutch sleeve member and connected to the motor unit at a point preceding the last gear step (7) for transmitting low torque, a torque transmission limiting coupling (18a, 18c) provided between said driving shaft (9) and said output shaft (14, 14b), and a free-wheel coupling (22,23) located between the clutch sleeve member (12) and the output shaft (14) and adapted to effect an automatic shift from low torque to high torque transmission when the predetermined maximum torque of the torque transmission limiting coupling be exceeded, said free wheel coupling including a free wheel having back stop members (24) acting in the radial direction, the free wheel clutch (22,23) and the torque transmission limiting coupling (18a, 18c) being provided in the clutch sleeve member on opposite sides of said central bearing (17).

2. A tool according to claim 1, wherein the input or driving shaft (9) is rotatably journalled in a bearing (15) located in the clutch sleeve member (12).

3. A tool according to claim 1 wherein the clutch sleeve member (12) is connected to the last gear step by means of an input connection (8a), the output shaft (14) is by means of an output connection (14a) coupled to the workpiece, and the clutch sleeve member (12) and the output shaft (14) respectively extend unsupported or freely between said input and output connections.

4. A tool according to claim 1, wherein the clutch sleeve member is provided with two axially spaced bearings (16,17) for mounting the output shaft (14) thereto, the free wheel clutch being located between said two bearings, the axially inner one of which being said central bearing.

5. A tool according to claim 4, wherein the free wheel coupling includes at least two free wheels (22 and 23).

6. A tool according to claim 13, wherein the torque transmission limiting coupling is a tooth clutch (18a, 18c) comprising a first tooth rim (18a) having axial teeth with oblique flanks and secured to the input or driving shaft (9), and a second tooth rim (18c) having axial teeth corresponding to the teeth of said first tooth rim and provided on a clutch sleeve (18b) which is axially displaceably but non-rotatably mounted on the output shaft (14b), and wherein a torque limiting spring (26) is provided between the output shaft (14) and said clutch sleeve (18b) so as to hold said tooth rims (18a, 18c) yieldably engaged.

7. A tool according to claim 6, wherein the output shaft (14b) is provided with a ball locking mechanism (27) which cooperates with said clutch sleeve (27) to lock the same when the clutch sleeve has been axially displaced from its tooth rim engaging position to its tooth rim releasing position upon exceeding the predetermined low torque limit which corresponds to said predetermined maximum torque of said torque transmission limiting coupling.

8. A tool according to claim 6, wherein the ball locking mechanism comprises a number of locking balls (27) which co-operate with the clutch sleeve (14b) and are radially movably mounted in the output shaft (14c), a locking actuating rod (28) is axially displaceably mounted in the output shaft (14, 14c) between a first position in which the rod locks the balls in a radially projected locking position, and a second position in which the balls are released to move to a radially inward position, a spring (30) is provided to bias the rod (28) towards its ball locking position, and a control rod (29) is co-axially and displaceably mounted relative to the locking rod (28) to actuate the same through said spring (30), said control rod (29) being adapted to be actuated by the workpiece so as to automatically bias the locking rod (28) towards the ball locking and ball releasing position respectively.

9. A rotary pneumatic tool such as a non-impacting nut runner, a screw driver or like tool having means for automatic torque shift, comprising a motor unit (1), speed reducing gear steps (5, 6, 7) connected to the motor unit, a clutch sleeve member (12) drivingly connected to the last one (7) of said gear steps for transmitting high torque, an output shaft (14) co-axial with and rotatably mounted relative to the clutch sleeve member, means (3) connectable to the output shaft (14) and provided for engaging and fastening a threaded fastening member, an input or driving shaft (9) co-axially and rotatably mounted relative to said clutch sleeve and connected to a speed reducing gear step preceding the last gear step (7) of the speed reducing gear for transmission of low torque, a first tooth rim (18a) having axial teeth with oblique flanks, a second tooth rim (18c) co-axial with said first tooth rim and having axial teeth corresponding to the teeth of said first tooth rim (18a) to cooperate therewith, a clutch sleeve (18b) nonrotatably but axially displaceably mounted on the output shaft (14, 14b), said displaceable clutch sleeve supporting said second tooth rim (18c) and being axially displaceable between a tooth rim releasing and a tooth rim engaging position respectively, a torque transmission limiting spring (26) provided between the output shaft (14) and said displaceable clutch sleeve (18b) so as to bias said clutch sleeve towards its tooth rim engaging position, a ball locking mechanism (27) supported by the output shaft (14c) and provided to be controlled in response to the cooperation of the threaded member with the fastening members of the tool so as to lock the displaceable clutch sleeve (18b) in its tooth rim releasing position upon transmission of high torque, and a free wheel coupling (22, 23) provided between the clutch sleeve member (12) and the output shaft (14) for effecting automatic torque shift when said first tooth rim (18a) upon exceeding a predetermined maximum low torque axially urges the second tooth rim (18c) out of engagement, thus displacing the displaceable clutch sleeve (18b) to its position where it is locked by the ball locking mechanism.

10. A tool according to claim 9, in which the ball locking mechanism comprises locking balls (27) radially movably mounted in the output shaft (14c) and cooperating with the displaceable clutch sleeve (18b), an axially movable locking rod (28) mounted in the output shaft (14) and displaceable between a first position, in which it locks the locking balls (27) in a radially projected position, and a second position in which the locking balls are released, a spring member (32) for biasing the locking rod (28) towards its position for locking the locking balls, and a rod member (29) which is axially movable relative to the output shaft and through said spring member (30) actuates said locking rod (28) for cooperation with the threaded member to be fastened and automatically biasing the locking rod (28) towards its ball locking and ball releasing position respectively.

11. A rotary pneumatic torque tool such as a non-impacting nut runner, a screw driver or like tool having means for automatic torque shift, comprising a motor unit (1), a power transmission connected to the motor unit and including at least one speed reducing gear step, a clutch sleeve member (12) connected to said gear step in the power transmission for transmitting high torque, an inner central bearing (17) mounted in the clutch sleeve member (12), an output shaft (14) rotatably and co-axially mounted in the inner central bearing (17) in the clutch sleeve member (12), means (3) connectable to the output shaft for fastening a threaded member, an input or driving shaft (9) mounted co-axially and rotatably relative to the clutch sleeve member (12), said input shaft (9) being connected to said power transmission at a point preceding the last of said at least one gear step in order to transmit low torque, a torque transmission limiting clutch provided to be disengaged at a predetermined maximum low torque, said clutch being located axially ahead of the central bearing (17) as seen in the direction of the power flow to form a clutch directly between the input and output shafts (9, 14), and a free wheel (22, 23) located axially after said central bearing (17) and operatively coupled between the clutch sleeve member (12) and the output shaft (14), said free wheel having radially active back stop members (24) for obtaining an automatic torque shift from low torque to high torque when the predetermined maximum torque of the torque transmission limiting coupling (18a, 18c) be exceeded.

12. A tool according to claim 11, comprising a ball locking mechanism (27) controlled by the cooperation between the threaded member and the fastening members of the tool, said ball locking mechanism being mounted in the output shaft (14c) and selectively locking the torque transmission limiting clutch (18c, 18c) in its disengaged position when transmitting high torque.

* * * * *

UNITED STATES PATENT OFFICE
CERTIFICATE OF CORRECTION

Patent No. 3,696,871   Dated October 10, 1972

Inventor(s)   JOHAN RUNAR STENBACKA

It is certified that error appears in the above-identified patent and that said Letters Patent are hereby corrected as shown below:

Column 7, line 59, replace "13" with --1--.

Signed and sealed this 13th day of March 1973.

(SEAL)
Attest:

EDWARD M. FLETCHER, JR.
Attesting Officer

ROBERT GOTTSCHALK
Commissioner of Patents